(12) United States Patent
Su et al.

(10) Patent No.: US 12,298,387 B2
(45) Date of Patent: May 13, 2025

(54) THREE-DIMENSIONAL DEFORMATION FIELD MODELING METHOD FUSING GNSS/InSAR OBSERVATION DATA

(71) Applicants: LANZHOU JIAOTONG UNIVERSITY, Lanzhou (CN); INSTITUTE OF EARTHQUAKE FORECASTING, CEA, Beijing (CN)

(72) Inventors: Xiaoning Su, Lanzhou (CN); Qian Zhao, Lanzhou (CN); Jiangang Feng, Lanzhou (CN); Guojie Meng, Lanzhou (CN); Wenda Wang, Lanzhou (CN)

(73) Assignees: LANZHOU JIAOTONG UNIVERSITY, Lanzhou (CN); INSTITUTE OF EARTHQUAKE FORECASTING, CEA, Beijing (CN)

( * ) Notice: Subject to any disclaimer, the term of this patent is extended or adjusted under 35 U.S.C. 154(b) by 0 days.

(21) Appl. No.: 18/784,934

(22) Filed: Jul. 26, 2024

(65) Prior Publication Data
US 2025/0076492 A1 Mar. 6, 2025

(30) Foreign Application Priority Data
Aug. 28, 2023 (CN) .......................... 202311088473.7

(51) Int. Cl.
*G01S 13/90* (2006.01)
*G01S 19/40* (2010.01)

(52) U.S. Cl.
CPC ........ *G01S 13/904* (2019.05); *G01S 13/9023* (2013.01); *G01S 19/40* (2013.01)

(58) Field of Classification Search
CPC ..... G01S 13/904; G01S 13/9023; G01S 19/40
See application file for complete search history.

(56) References Cited

U.S. PATENT DOCUMENTS

| | | | |
|---|---|---|---|
| 2009/0237297 A1* | 9/2009 | Davis .................. | G01S 13/9023 342/25 A |
| 2021/0011149 A1* | 1/2021 | Hu ........................ | G01S 19/485 |

* cited by examiner

*Primary Examiner* — Timothy A Brainard

(57) ABSTRACT

Disclosed is a three-dimensional deformation field modeling method fusing global navigation satellite system (GNSS)/synthetic aperture radar interferometry (InSAR) observation data. The three-dimensional deformation field modeling method includes: five parts of solving an InSAR line-of-sight velocity field, unifying a spatial reference datum of the GNSS data and the InSAR data, verifying precision of a result of the InSAR data, solving a three-dimensional deformation field having high precision based on a least square method, and analyzing and verifying a result. According to the method, the InSAR data is processed according to a high-precision time series method, a long-wavelength error of the InSAR data is corrected on the basis of a difference of two data spatial reference datums, and the accuracy of the result is ensured through verification of internal coincidence precision.

4 Claims, 18 Drawing Sheets

THREE-DIMENSIONAL DEFORMATION FIELD MODELING METHOD FUSING GNSS/InSAR OBSERVATION DATA

TECHNICAL FIELD

The present disclosure relates to the field of surveying and mapping, and in particular to a three-dimensional deformation field modeling method fusing global navigation satellite system (GNSS)/synthetic aperture radar interferometry (InSAR) observation data.

BACKGROUND

Global navigation satellite system (GNSS) and synthetic aperture radar interferometry (InSAR), two space geodetic surveying technology, are widely used in the study of large-range crustal deformation observation. Although GNSS data has high precision, it is not possible to obtain near-field continuous surface deformation characteristics with high cost of station layout and terrain reasons; the InSAR technology has the advantages of all-day, all-weather, and high spatial resolution, and however, it is challenging to obtain an accurate long-term velocity field with the presence of an orbital error, a terrain error, an incoherence error, and an atmospheric error, and it is not sufficient to illustrate complete three-dimensional deformation characteristics with limitations of one-dimensional line-of-sight deformation. Furthermore, a spatial reference datum and sensitivity to deformation dimensions of the two data sources are different. An InSAR line-of-sight velocity field uses an average reference datum for each orbit, while a GNSS velocity field is relatively a Eurasian reference frame. InSAR data is highly sensitive to vertical deformation, but insensitive to north-south deformation. GNSS data has higher precision in monitoring horizontal deformation, but lower precision in monitoring vertical deformation. If the advantages of the InSAR data and the GNSS data can be combined, a three-dimensional deformation field having high precision and high spatial resolution can be obtained, which can further analyze crustal deformation characteristics of a study region.

At present, there have been a number of methods fusing GNSS/InSAR data to obtain a three-dimensional deformation field. For example, east-west and vertical velocity fields are solved according to a north-south GNSS velocity field as prior information; a three-dimensional deformation field is calculated in combination with a GNSS three-dimensional velocity field and an InSAR lift orbit line-of-sight velocity field; and a three-dimensional deformation field is solved in combination with a physical strain tensor estimation method, and weights of GNSS data and InSAR data are determined according to a probability model, and are fused to solve a three-dimensional deformation field. The methods ultimately obtain the three-dimensional deformation field having high precision, but the methods from high-precision calculation of original velocity field data, to unified reference framework and error correction before GNSS/InSAR data fusion, and to final obtaining of the three-dimensional deformation field by means of calculation are still unclear.

In summary, the present disclosure provides a three-dimensional deformation field modeling method fusing GNSS/InSAR observation data. The method ensures the accuracy of data by means of high-precision data processing and cross validation of multi-source data, and performs calculation according to a least square principle, so as to obtain a three-dimensional deformation field having a large range, high precision and high spatial resolution.

SUMMARY

The present disclosure provides a three-dimensional deformation field modeling method fusing global navigation satellite system (GNSS)/synthetic aperture radar interferometry (InSAR) observation data, which can not only ensure the accuracy of data by means of high-precision data processing and precision verification, but also obtain a three-dimensional deformation field having high precision and a large range in combination with the advantages of two kinds of data.

In order to achieve the above objective, the present disclosure uses the following technical solution:

a three-dimensional deformation field modeling method fusing GNSS/InSAR observation data includes five parts of solving an InSAR line-of-sight velocity field, unifying a spatial reference datum of GNSS data and InSAR data, verifying precision of a result of the InSAR data, solving a three-dimensional deformation field having high precision based on a least square method, and analyzing and verifying a result, where the solving an InSAR line-of-sight velocity field includes:
S1, carrying out time series processing according to a small baseline subset InSAR (SBAS-InSAR) method, setting a reasonable space-time baseline threshold, and selecting an interference pair; and
S2, correcting an atmospheric delay error;

the unifying a spatial reference datum of GNSS data and InSAR data includes:
S3, down-sampling the InSAR line-of-sight velocity field to find the same name points of ascending and descending orbit data; and
S4, projecting a GNSS velocity field to a line-of-sight, then subtracting the GNSS velocity field from the InSAR data, and correcting an original InSAR line-of-sight velocity field of each orbit on the basis of a quadratic polynomial fitting difference;

the verifying precision of a result of the InSAR data includes:
S5, calculating a difference distribution of the same name points of the InSAR data in an overlapping region of adjacent orbits;

the solving a three-dimensional deformation field having high precision based on a least square method includes:
S6, interpolating the GNSS data into a continuous velocity field having the same resolution as the InSAR data, constructing a three-dimensional decomposition equation, and solving a three-dimensional deformation field on the basis of the least square method; and the analyzing and verifying a result includes:
S7, carrying out verification in combination with regional tectonic deformation data.

The three-dimensional deformation field modeling method fusing GNSS/InSAR observation data according to the present disclosure has high scientificity, efficiency and applicability, and not only combines the advantages of two kinds of data by fusing the GNSS/InSAR observation data, but also overcomes respective limitations, thereby obtaining more complete three-dimensional deformation information. The method is easy to implement and can be widely applied to the field of geological hazard monitoring and engineering deformation monitoring.

BRIEF DESCRIPTION OF THE DRAWINGS

In order to more clearly describe the technical solutions in the examples of the present disclosure or in the prior art, the accompanying drawings and the tables required for the description of the examples or the prior art will be simply introduced below. Obviously, the accompanying drawings in the following description are merely schematic diagrams and tables of the present disclosure. Those of ordinary skill in the art would further be able to derive other accompanying drawings and tables from the accompanying drawings without making inventive efforts.

DETAILED DESCRIPTION OF THE EMBODIMENTS

The technical solutions in the examples of the present disclosure will be clearly and completely described below in combination with the accompanying drawings in the examples of the present disclosure. Apparently, the examples described are only some examples rather than all examples of the present disclosure. All other examples obtained by those of ordinary skill in the art on the basis of the examples of the present disclosure without making creative efforts fall within the scope of protection of the present disclosure.

The step of solving an InSAR line-of-sight velocity field includes:

Step 1, processing InSAR data according to a satellite-based augmentation system (SBAS)-InSAR method. A large number of redundant interference pairs are obtained by setting a space-time baseline threshold, and the accuracy of a velocity field result is improved according to a multi-view ratio of 20:4 (distance direction: azimuth direction) (46.6 m×55.9 m) used. A coherence coefficient threshold is set as 0.4, a time baseline threshold is set as 2000 days, and a space baseline threshold is set as 50 m. The number of interference pairs generated for each orbit is at least 4 times the number of original images. A space-time baseline network for each orbit is shown in FIG. 2A, FIG. 2B, FIG. 2C and FIG. 2D. Low-speed deformation at a millimeter level can be better estimated by adding a long-term baseline interferogram into a small baseline interferometric network, and an incoherent effect caused by terrain undulations can be effectively reduced by limiting a space baseline.

Figure 1:
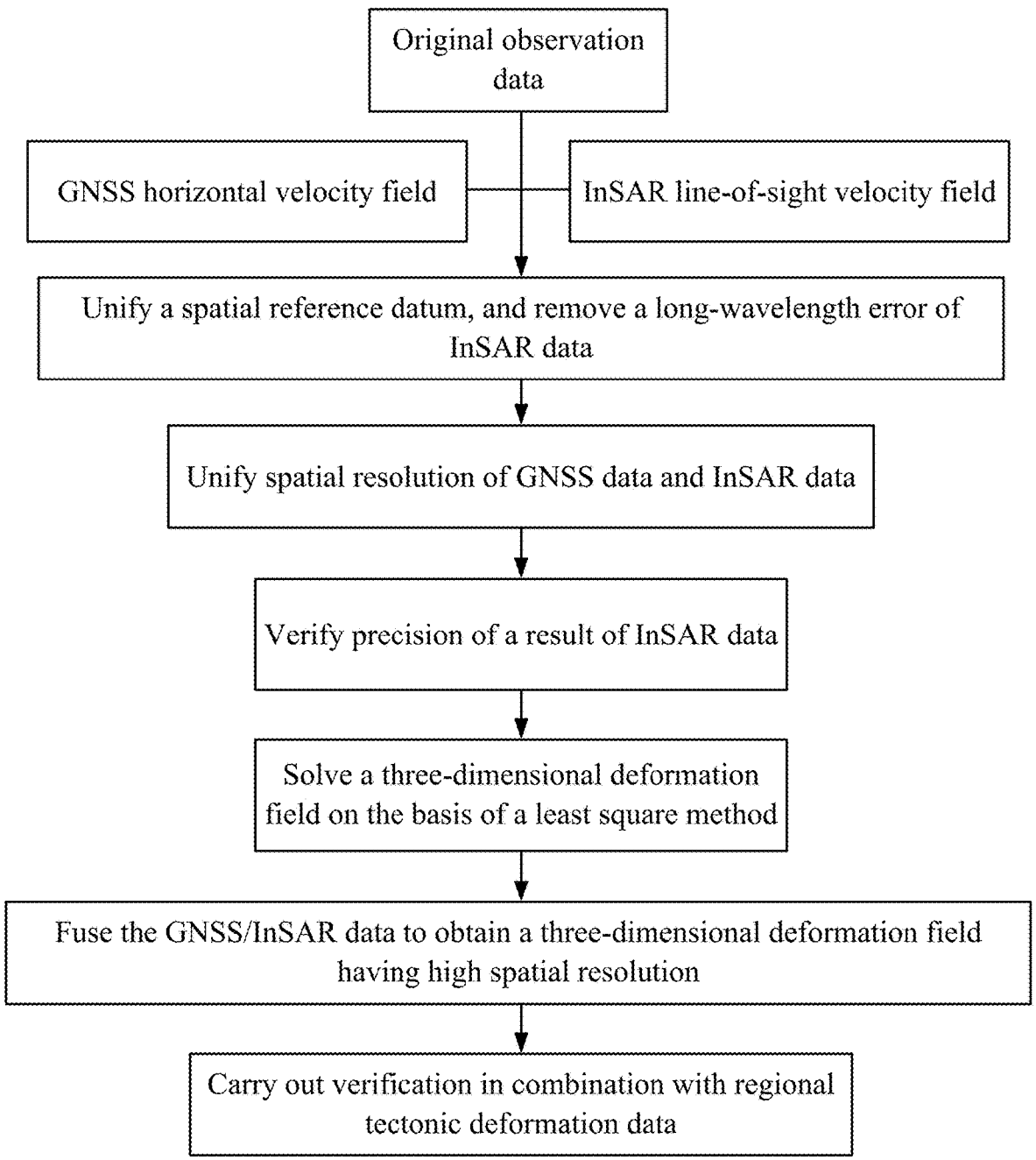
FIG. 1 is a flow chart of a three-dimensional deformation field modeling method fusing global navigation satellite system (GNSS)/synthetic aperture radar interferometry (InSAR) observation data according to the present disclosure.
Figure 2A:
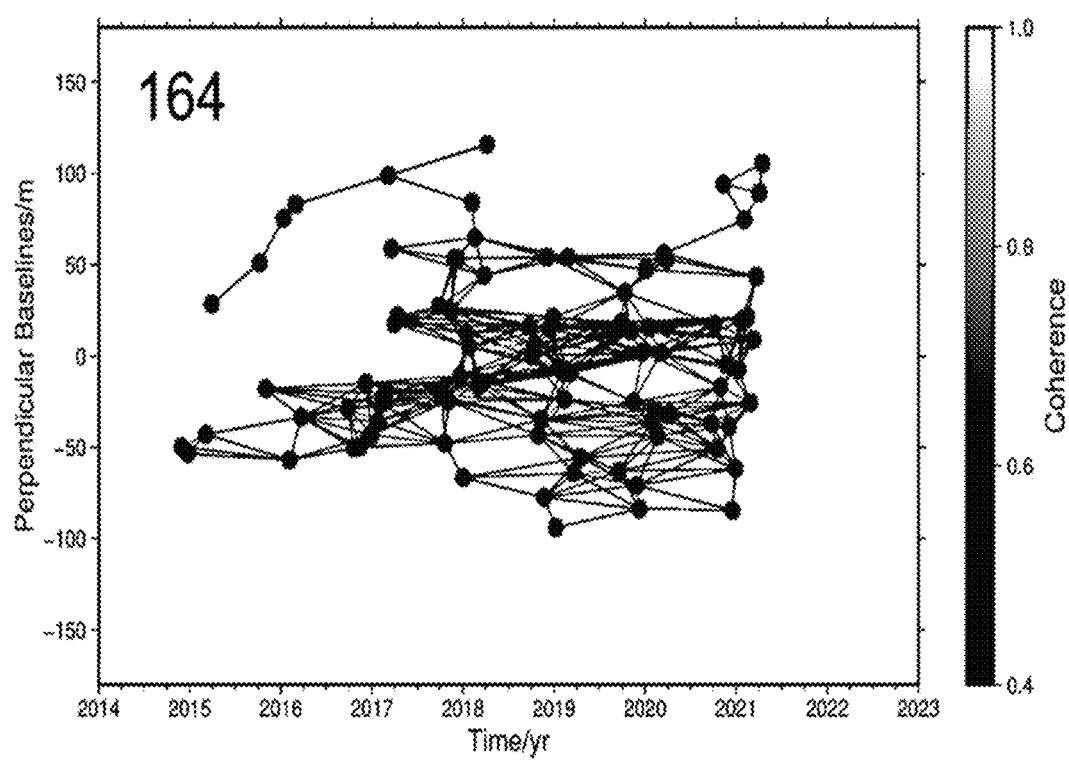
FIG. 2A is a schematic diagram of an interference baseline of an orbit picture of a space-time baseline 164.
Figure 2B:
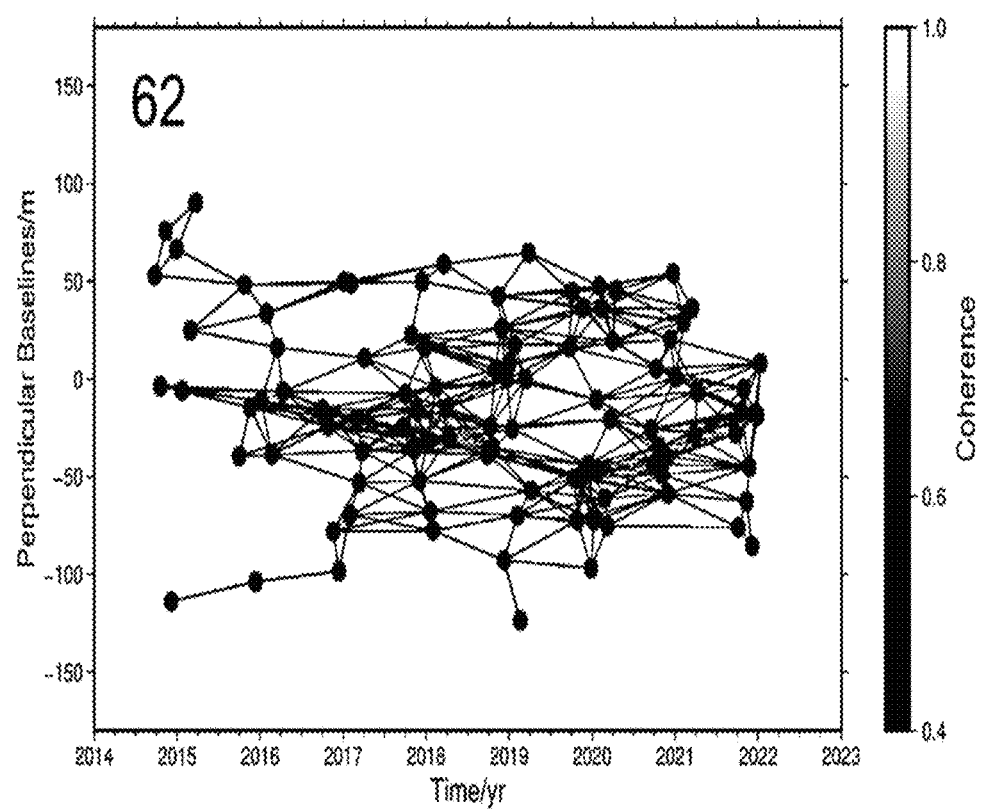
FIG. 2B is a schematic diagram of an interference baseline of an orbit picture of a space-time baseline 62.
Figure 2C:
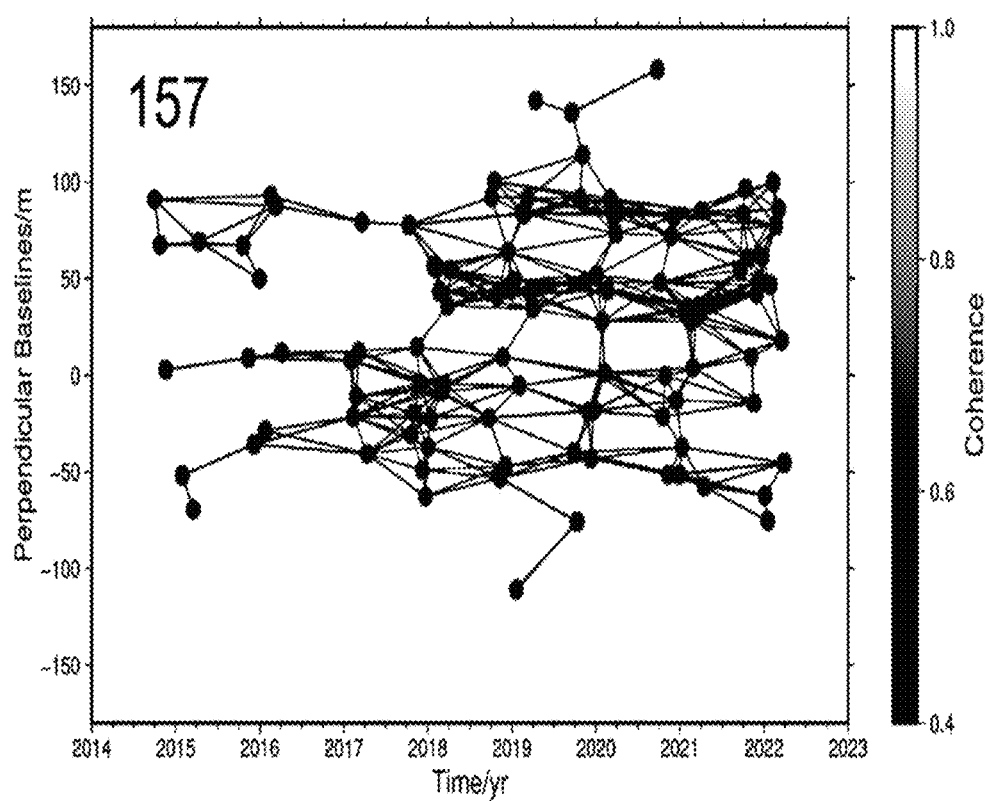
FIG. 2C is a schematic diagram of an interference baseline of an orbit picture of a space-time baseline 157.
Figure 2D:
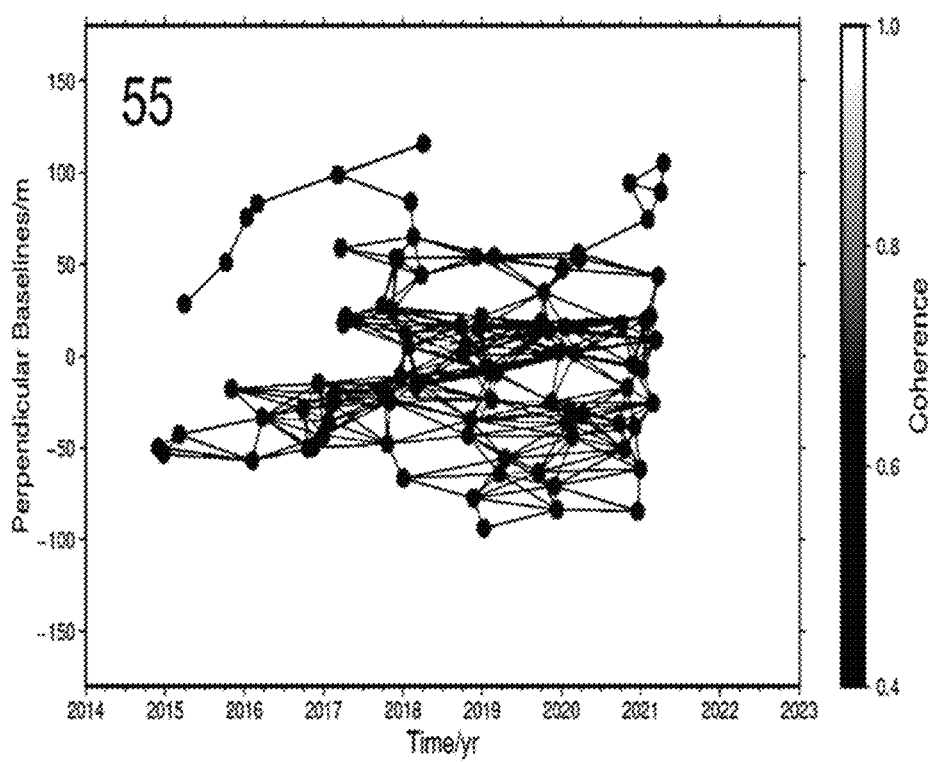
FIG. 2D is a schematic diagram of an interference baseline of an orbit picture of a space-time baseline 55.
Figure 3A:
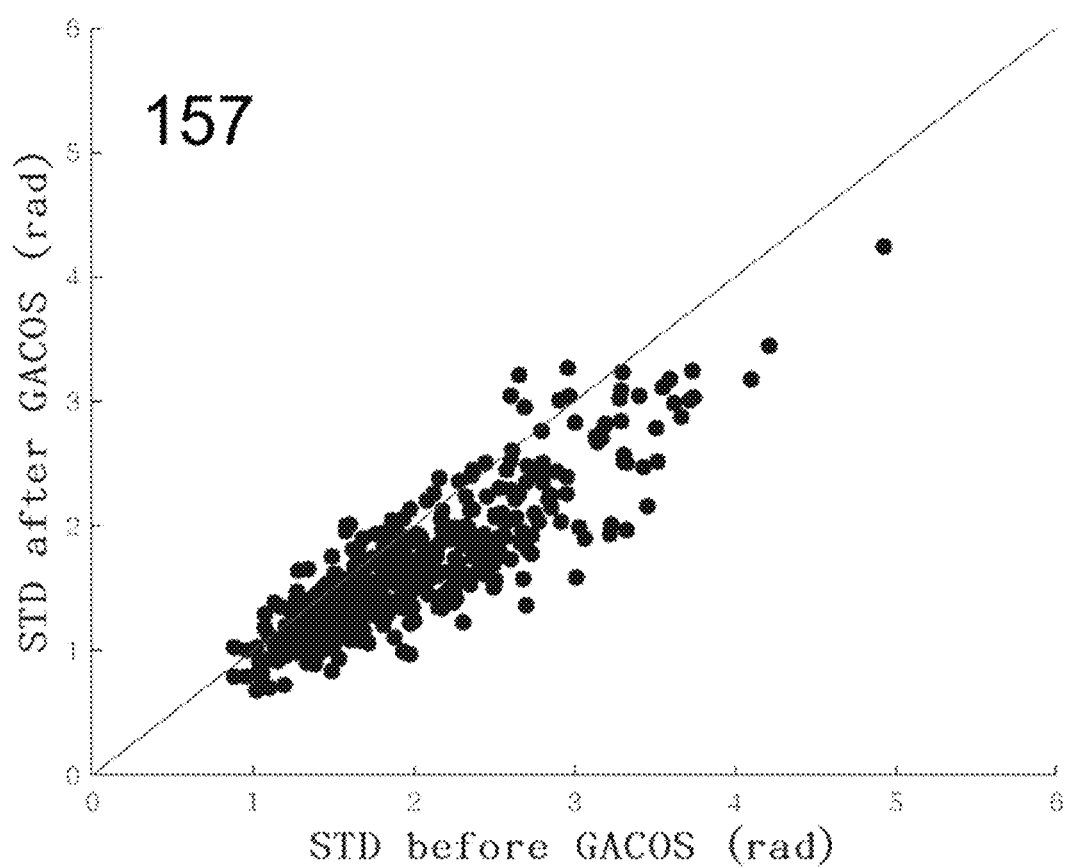
FIG. 3A is a schematic comparison diagram before and after removing atmospheric delay errors of deformation of orbit 157 with Generic Atmospheric Correction Online Service for InSAR (GACOS).
Figure 3B:
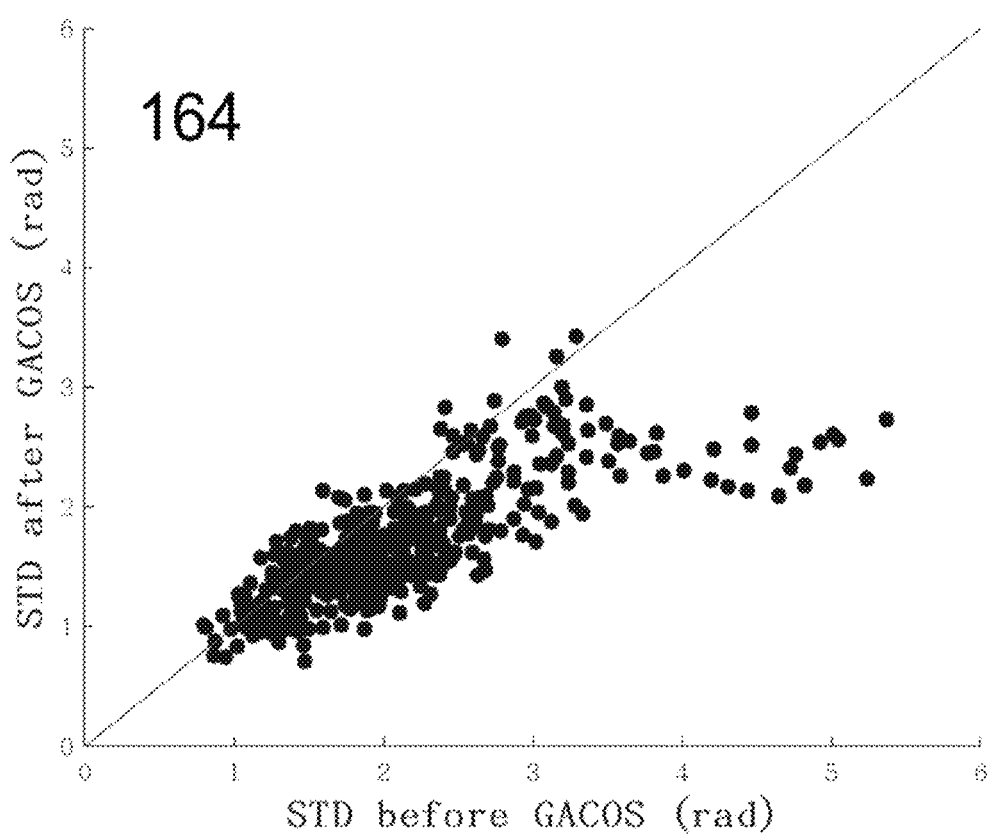
FIG. 3B is a schematic comparison diagram before and after removing atmospheric delay errors of deformation of orbit 164 with GACOS.
Figure 3C:
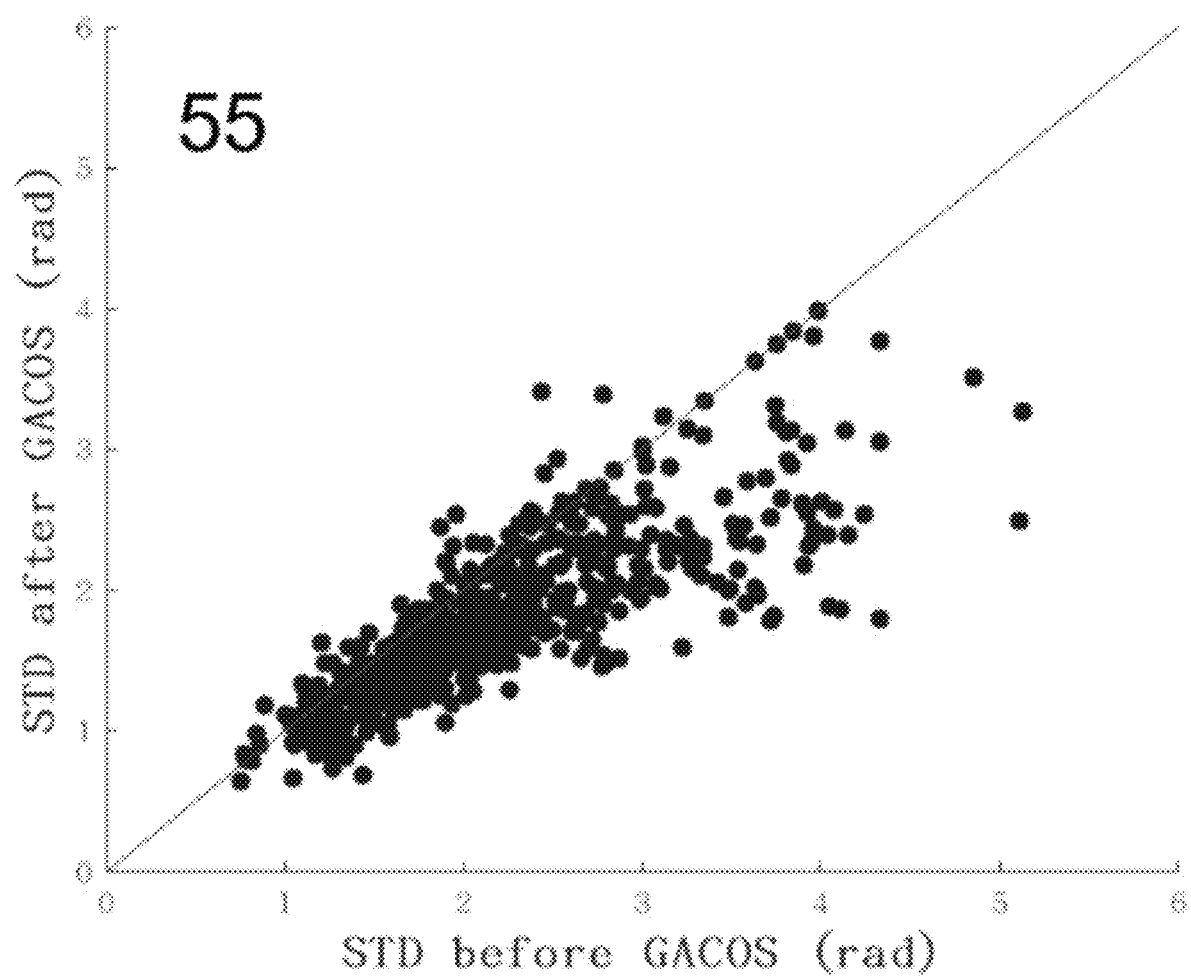
FIG. 3C is a schematic comparison diagram before and after removing atmospheric delay errors of deformation of orbit 55 with GACOS.
Figure 3D:
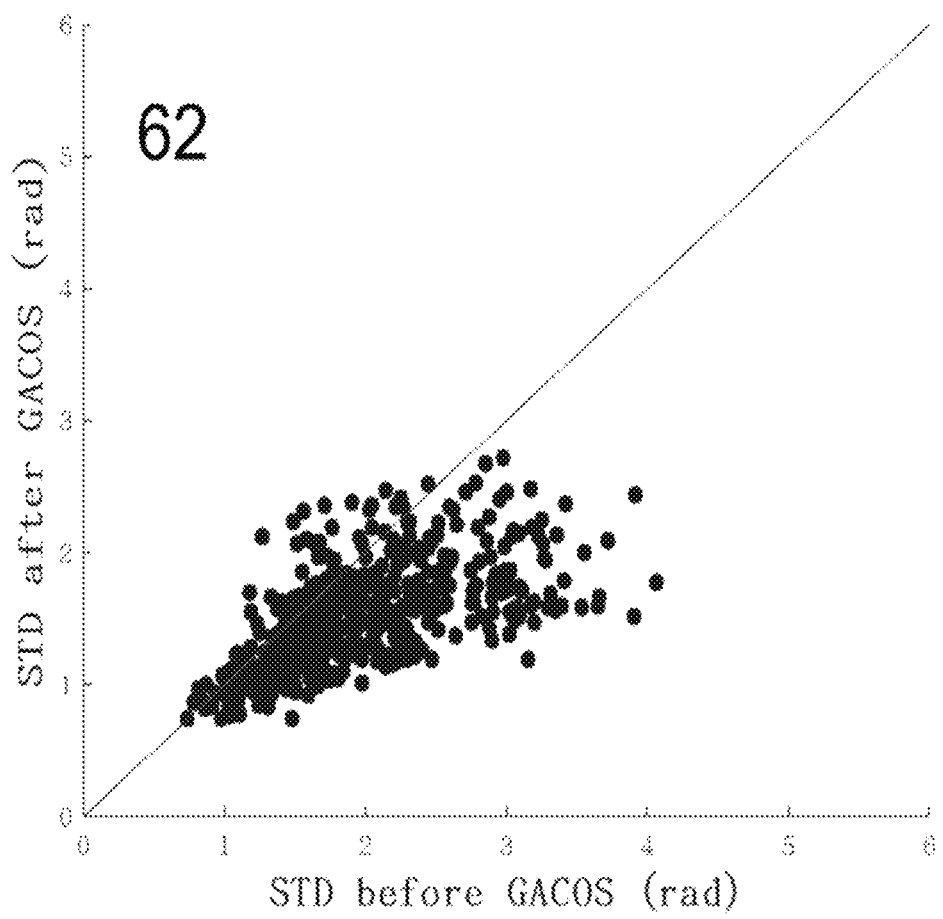
FIG. 3D is a schematic comparison diagram before and after removing atmospheric delay errors of deformation of orbit 62 with GACOS.
Figure 4A:
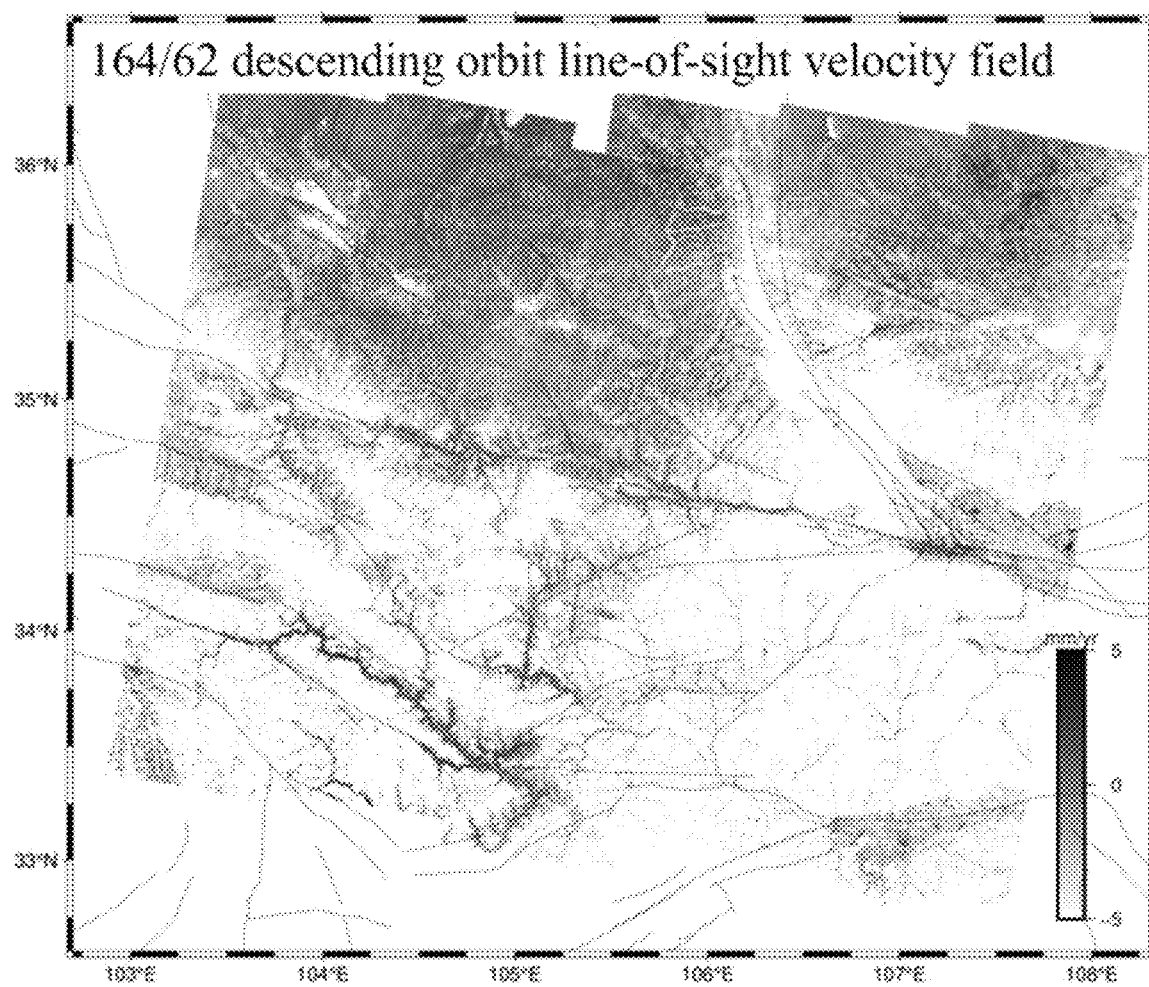
FIG. 4A is a schematic diagram of an InSAR 164/62 descending orbit line-of-sight velocity field.
Figure 4B:
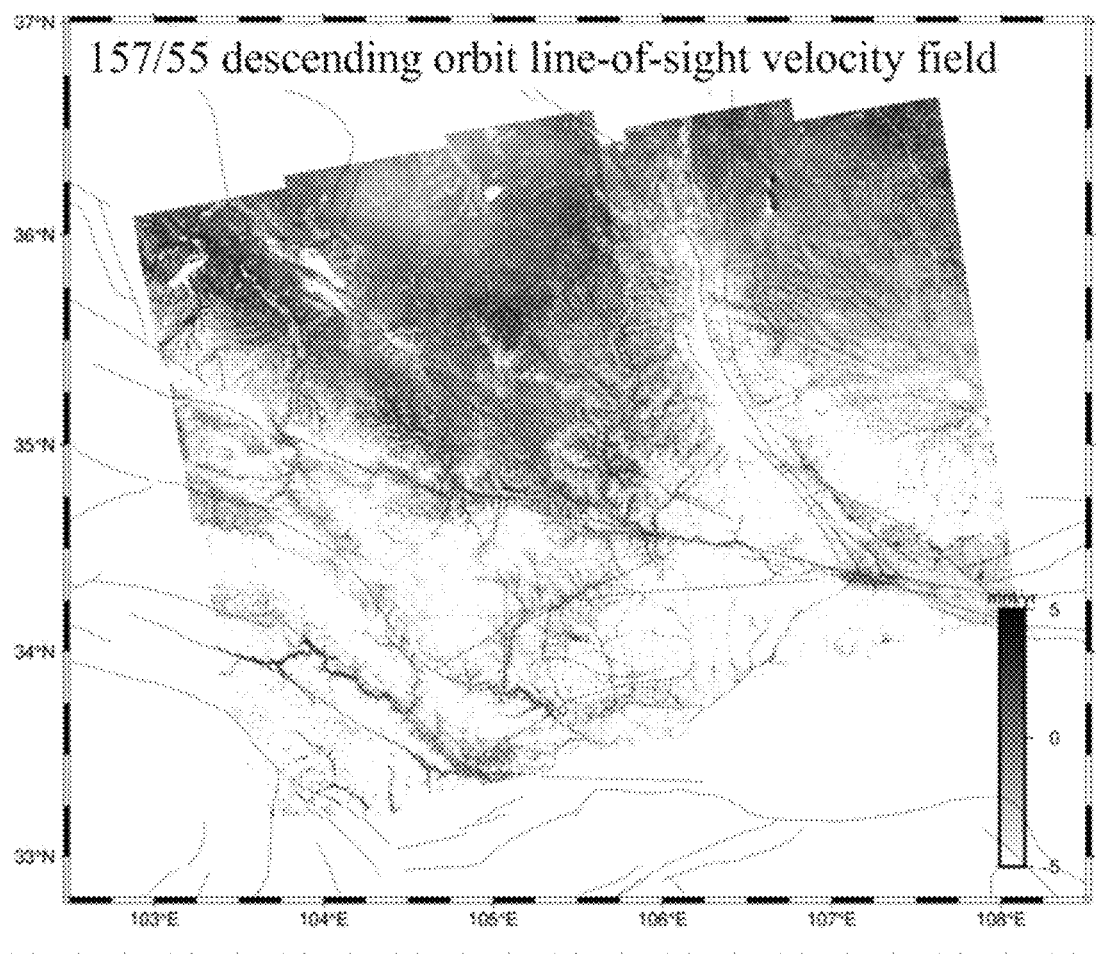
FIG. 4B is a schematic diagram of an InSAR 157/55 descending orbit line-of-sight velocity field.

Step 2, correcting an atmospheric delay error. An atmospheric error is corrected through a Generic Atmospheric Correction Online Service for InSAR (GACOS) system. The system obtains a tropospheric delay according to European Centre for Medium-Range Weather Forecasts (ECMWF) data and Shuttle Radar Topography Mission Digital Elevation Model (SRTM DEM) data at 90 m resolution, converts the tropospheric delay into a radar line-of-sight and subtracts the radar line-of-sight from a wrapped phase. The unwrapping accuracy is improved according to a three-dimensional (3D) phase unwrapping algorithm, and an unwrapping error in the interferogram is checked according to a phase closed-loop method. After primary phase unwrapping, the interference pairs having lower quality are removed, and phase unwrapping is carried out anew. Possible residual atmospheric delay errors are reduced by removing phase ramps. Comparisons of standard deviations of interferograms before and after atmospheric correction are shown in FIG. 3A, FIG. 3B, FIG. 3C and FIG. 3D. Standard deviations of interferograms of 80% of each orbit are reduced after atmospheric correction. Finally, InSAR line-of-sight velocity fields are obtained, as shown in FIG. 4A and FIG. 4B.

The step of unifying a spatial reference datum of GNSS data and InSAR data includes:

Step 3, down-sampling the InSAR line-of-sight velocity field to find the same name points of ascending and descending orbit data in order to improve calculation efficiency and subsequent establishment of a 3D decomposition equation. A study region is divided into a uniform grid of 1000 m×1000 m, and an average corresponding to all InSAR data points in a circle with a radius of 1000 m with each grid point as a center is used as a line-of-sight velocity value corresponding to the grid point.

Step 4, using an average corresponding to all InSAR data points of each orbit in a circle with a radius of 1000 m with a GNSS station coordinate as a center as an InSAR line-of-sight velocity corresponding to a GNSS station, projecting a GNSS horizontal velocity field to a line-of-sight, then subtracting the GNSS velocity field from the corresponding InSAR data, and correcting an original InSAR line-of-sight velocity field on the basis of a quadratic polynomial fitting difference. A projection formula is as follows:

$$D_{LOS} = -D_e \cos(\alpha)\sin(\theta) + D_n \sin(\alpha)\sin(\theta) + D_u \cos(\theta)$$

$D_{LOS}$ is a line-of-sight deformation, $D_e$, $D_n$ and $D_u$ are displacement components in an east-west direction, a north-south direction and a vertical direction respectively, $\alpha$ is an azimuth angle, and $\theta$ is an incident angle.

Figure 5A:
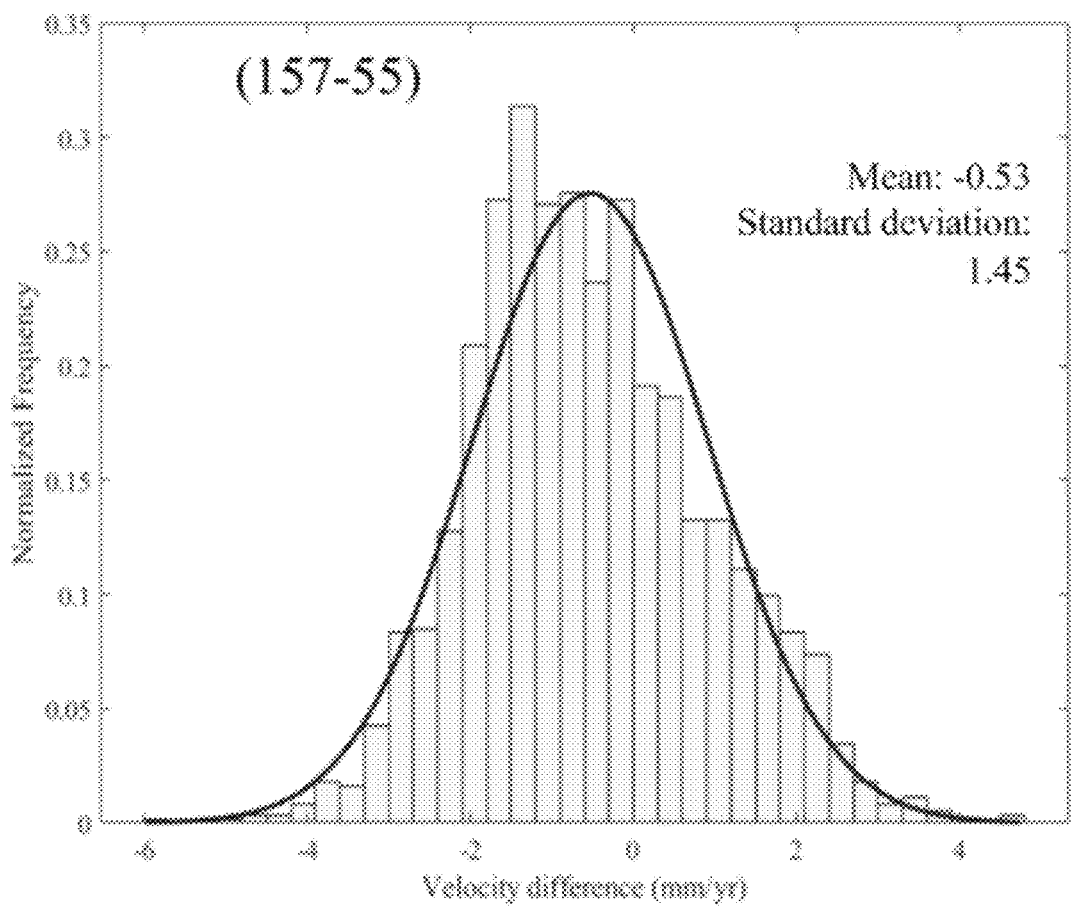
FIG. 5A is a statistical histogram of deformation differences of orbits 157 and 55 in an overlapping region of adjacent orbits.
Figure 5B:
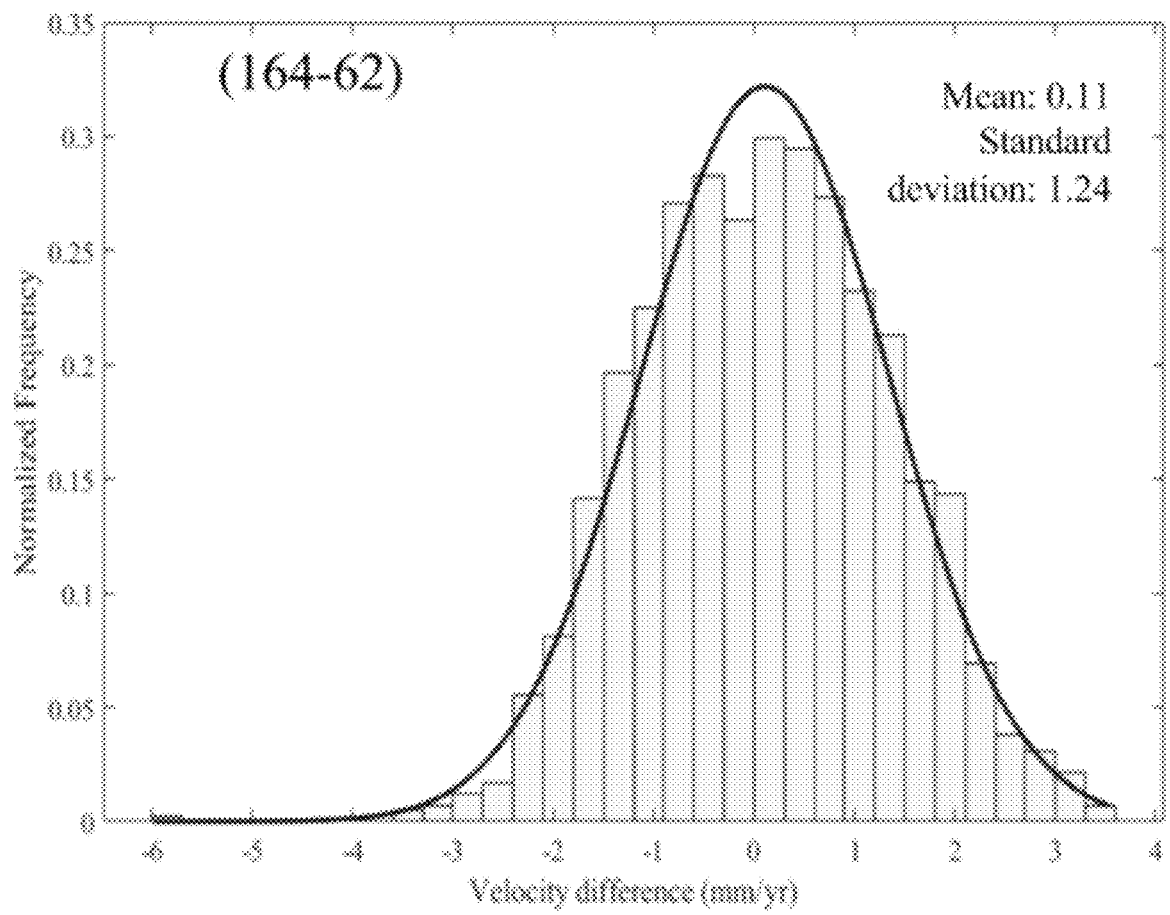
FIG. 5B is a statistical histogram of deformation differences of orbits 164 and 62 in an overlapping region of adjacent orbits.

The step of verifying precision of a result of the InSAR data includes:

Step 5, calculating a difference distribution of the same name points of the InSAR data in an overlapping region of adjacent orbits. In view of differences of local angles of incidence in the overlapping region, assuming only horizontal deformation in the study region, the InSAR data points in the overlapping region are divided by corresponding local angles of incidence and are multiplied by a central angle of incidence of the orbit. Finally, histograms of a data point difference distribution in the overlapping region of adjacent orbits are shown in FIG. 5A and FIG. 5B. The results show that an average value of a difference between the same name points of adjacent orbits is close to 0, and the uncertainty of an image velocity field of the ascending and descending orbit is 1.03 mm/yr and 0.89 mm/yr separately.

The step of solving a 3D deformation field having high precision on the basis of a least square method for verification includes:

Step 6, constructing a 3D decomposition equation, and solving a 3D deformation field on the basis of the least square method. In view that a GNSS vertical velocity field has larger uncertainty relative to a horizontal velocity field, GNSS east-west and north-south velocity fields and an InSAR ascending and descending orbit line-of-sight velocity field having the same resolution as InSAR data interpolated are used as input data. A specific formula is as follow, $\theta$ is a satellite angle of incidence, and a is a satellite azimuth angle. $V_{LOS}^A$ and $V_{LOS}^D$ are line-of-sight velocities of the ascending and descending orbit respectively, $V_{GNSS}^E$ and $V_{GNSS}N$ and VA GNSS are GNSS east-west and north-south velocity fields respectively, and $V_E$, $V_N$ and $V_U$ are east-west, north-south and vertical velocity fields obtained.

$$\begin{bmatrix} V_{LOS}^A \\ V_{LOS}^D \\ V_{GNSS}^E \\ V_{GNSS}^N \end{bmatrix} = \begin{bmatrix} -\sin\theta\cos\alpha^{(A)} & \sin\theta\sin\alpha^{(A)} & \cos\theta^{(A)} \\ -\sin\theta\cos\alpha^{(D)} & \sin\theta\sin\alpha^{(D)} & \cos\theta^{(D)} \\ 1 & 0 & 0 \\ 0 & 1 & 0 \end{bmatrix} \begin{bmatrix} V_E \\ V_N \\ V_U \end{bmatrix}$$

A known observation value is set as L, and a middle coefficient matrix is set as A, the rightmost is a finally solved 3D deformation field $\hat{X}$, an error matrix $V=L-A\hat{X}$ satisfies a least squares criterion, and the square sum of residuals is minimized, and thus $\hat{X}=(A^TPA)^{-1} A^TPL$.

Figure 6A:
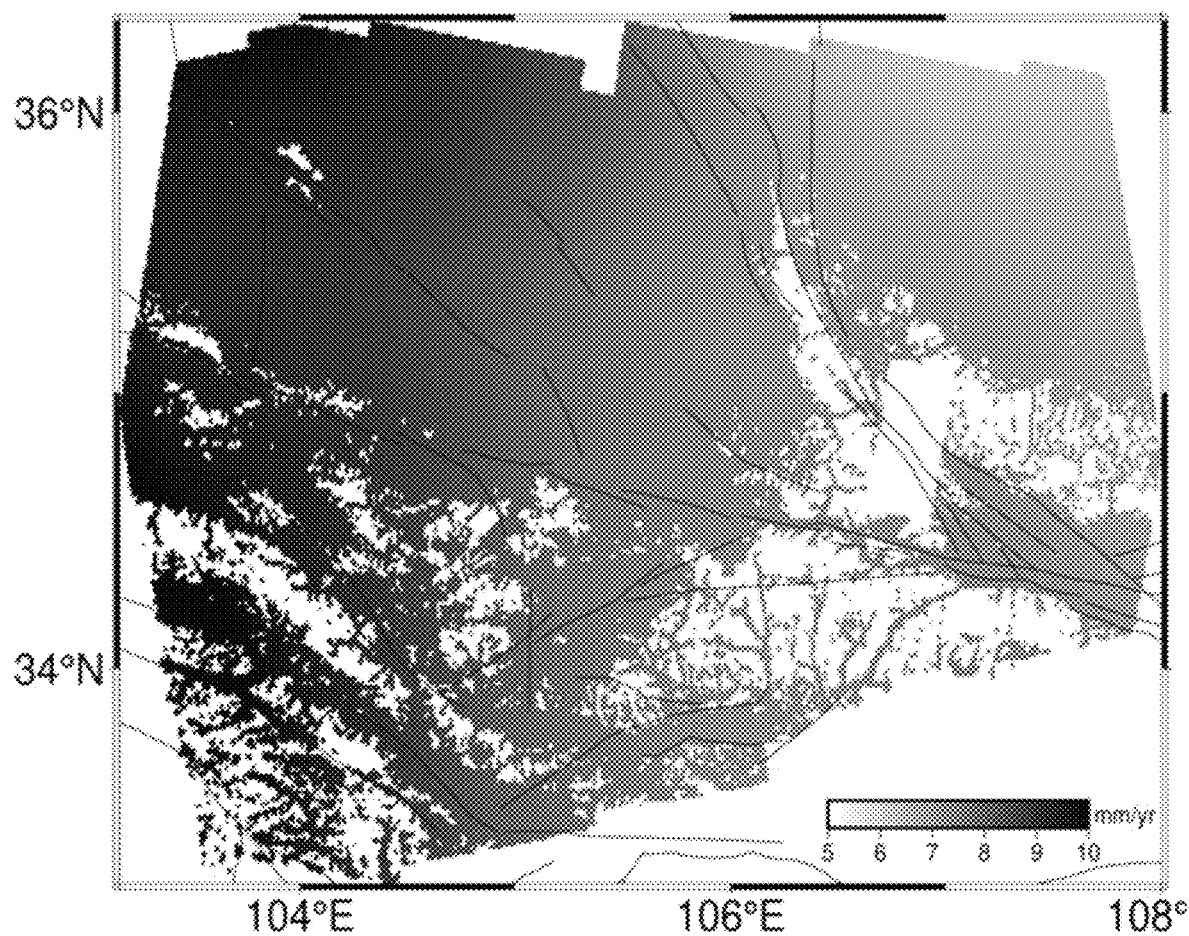
FIG. 6 is a schematic diagram of a GNSS horizontal velocity field after interpolation.
Figure 6B:
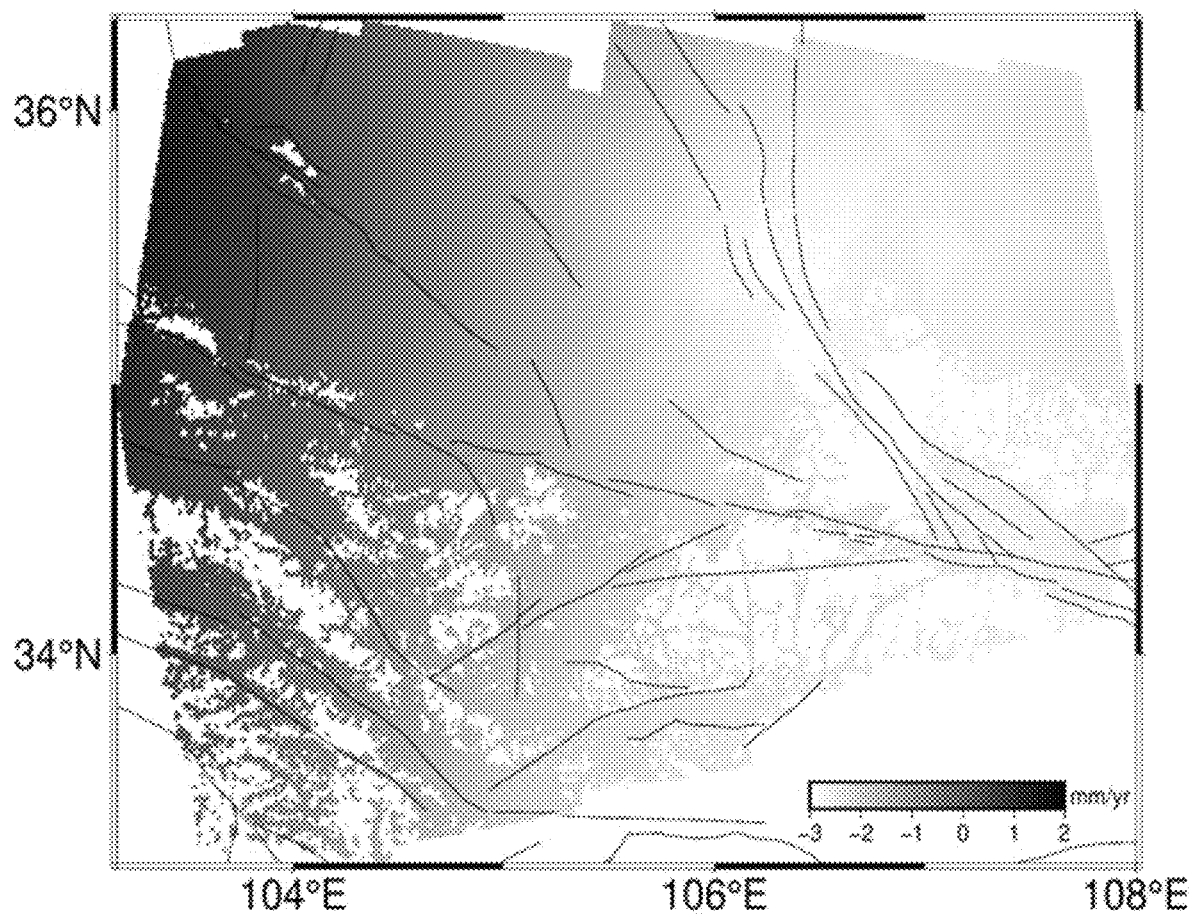
Figure 7:
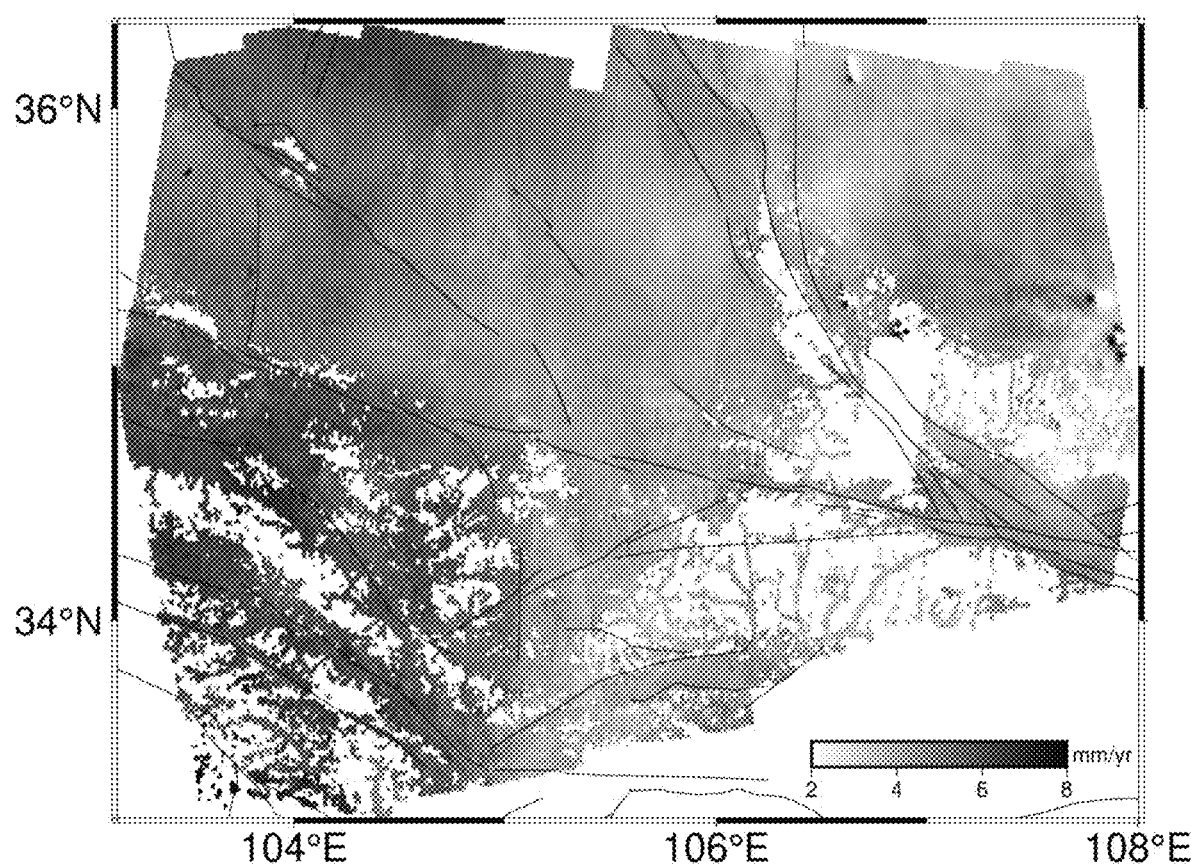
FIG. 7 shows an east-west deformation velocity field solved by fusing GNSS/InSAR observation data.
Figure 8:
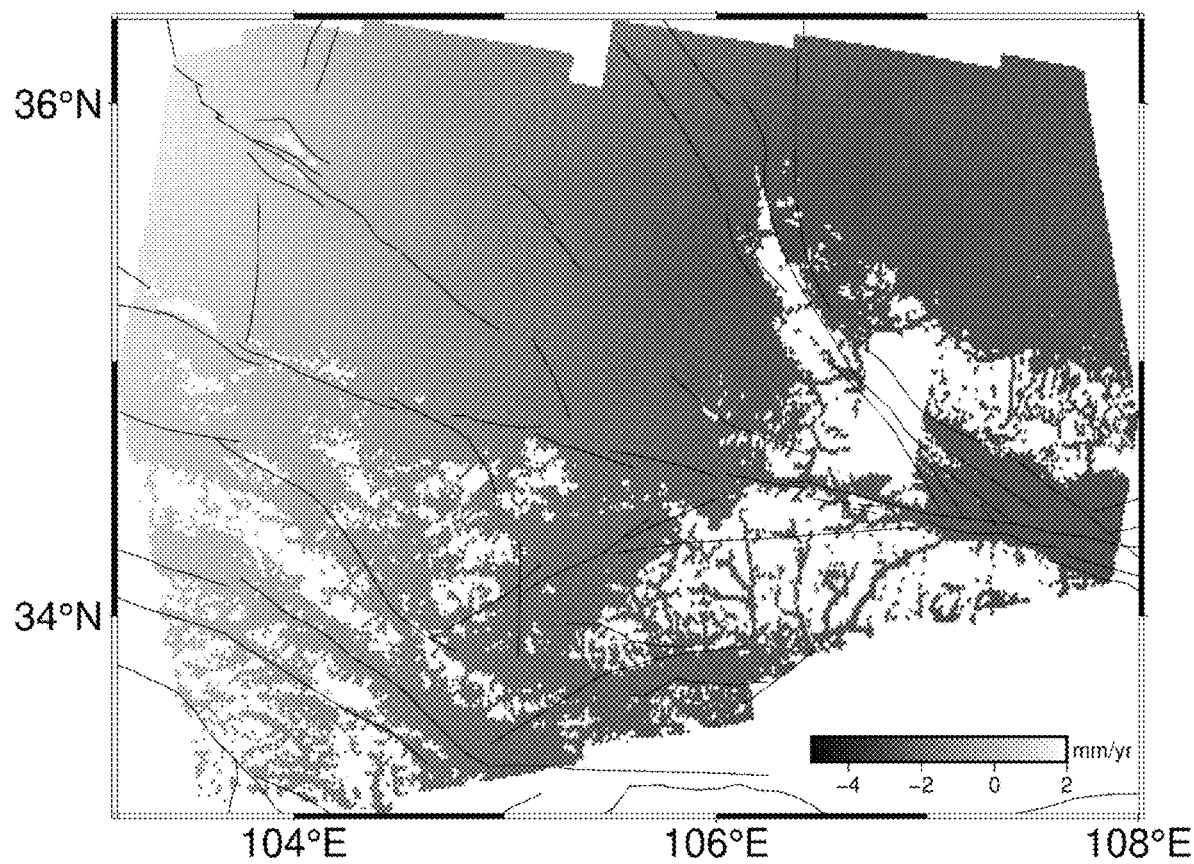
FIG. 8 shows a north-south deformation velocity field solved by fusing GNSS/InSAR observation data.
Figure 9:
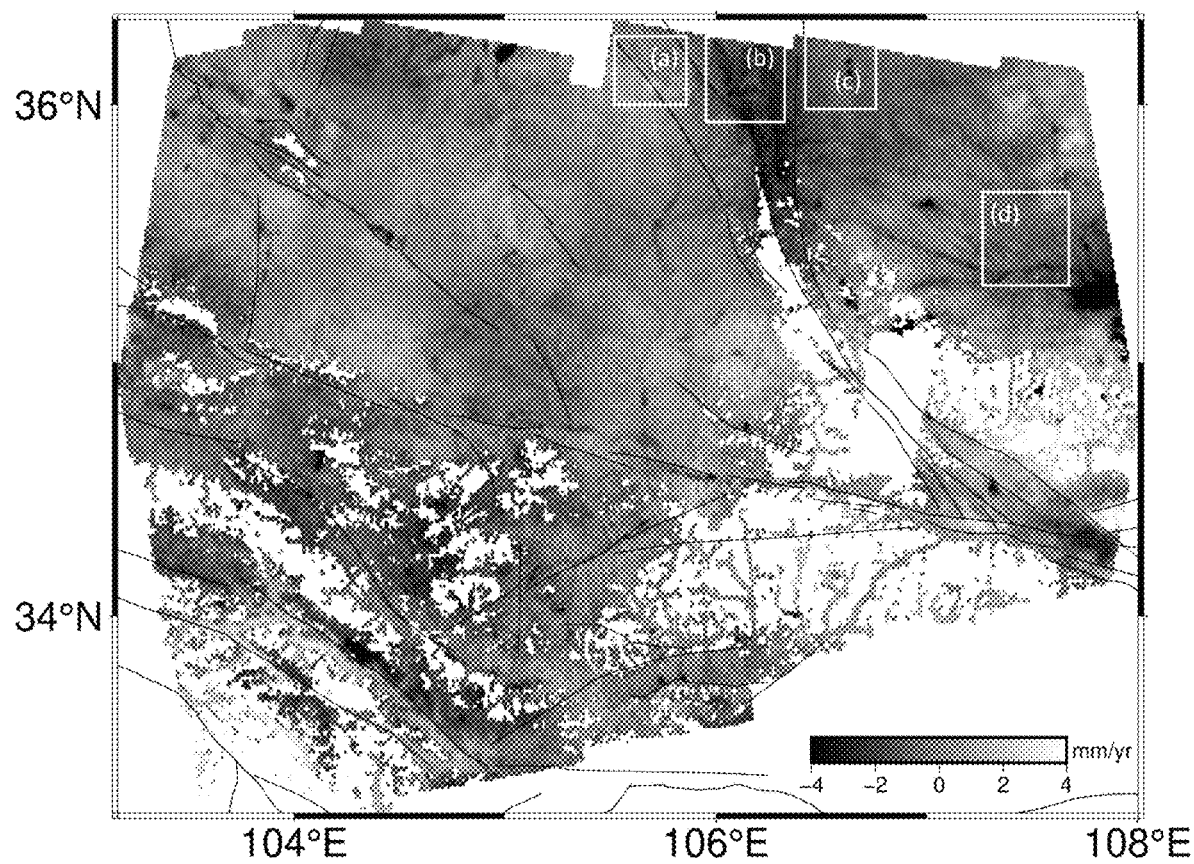
FIG. 9 shows a vertical deformation velocity field solved by fusing GNSS/InSAR observation data.

The interpolated GNSS horizontal velocity field is shown in FIG. 6A and FIG. 6B, and the finally obtained east-west, north-south and vertical velocity fields are shown in FIG. 7, FIG. 8 and FIG. 9 respectively.

Step 7, carrying out verification in combination with regional tectonic deformation data. According to the result of the east-west velocity field in FIG. 7, the study region as a whole shows a deformation trend of eastward extrusion, and a deformation rate is gradually reduced from west to east, which reflects that the lateral extrusion of Qinghai-Tibet Plateau is hindered by an Ordos block in the east. It can be seen from the north-south velocity field result in FIG. 8 that since a synthetic aperture radar (SAR) satellite is a near-polar orbit satellite and is insensitive to north-south deformation, the solved north-south velocity field result is similar to a result obtained after GNSS north-south velocity field interpolation. A west side shows north-direction deformation and an east side shows south-direction deformation, which conforms to clockwise rotation characteristics of the GNSS velocity field on the Qinghai-Tibet Plateau around an eastern end of Himalayas. It can be seen from the vertical velocity field result in FIG. 9 that the overall vertical deformation is complex. A region in which (a) and (b) are located is a Liupan Mountain fault having slight subsidence in an east side and slight uplift in a west side. (c) is a cultivated region in Wuwei City, which may be partially deformed due to farmland irrigation. (d) is a Huating mining area in Pingliang City, which shows significant mining subsidence. To sum up, the 3D deformation field modeling method fusing GNSS/InSAR observation data according to the present disclosure can obtain the 3D deformation field having high precision and high spatial resolution in combination with the advantages of two kinds of observation data.

The above description of the examples disclosed enables professionals skilled in the art to achieve or use the present disclosure. Various modifications to these examples are readily apparent to professionals skilled in the art, and the general principles defined in the present disclosure can be implemented in other examples without departing from the spirit or scope of the present disclosure. Therefore, the present disclosure is not limited to the examples shown in the present disclosure, but falls within the widest scope consistent with the principles and novel features disclosed in the present disclosure.

What is claimed is:

1. A three-dimensional deformation field modeling method fusing GNSS/InSAR observation data, comprising: five parts of solving an InSAR line-of-sight velocity field of a study region, unifying a spatial reference datum of GNSS data and InSAR data, verifying precision of a result of the InSAR data, solving a three-dimensional deformation field based on a least square method, and analyzing and verifying a result;

wherein the solving an InSAR line-of-sight velocity field of the study region comprises:
carrying out time series processing according to a SBAS-InSAR method, setting a reasonable space-time baseline threshold, and selecting an interference pair; and
correcting an atmospheric delay error;

wherein the unifying a spatial reference datum of the GNSS data and the InSAR data comprises:
down-sampling the InSAR line-of-sight velocity field to find the same name points of ascending and descending orbit data; and
projecting a GNSS velocity field to a line-of-sight, then subtracting the GNSS velocity field from the InSAR data, and correcting an original InSAR line-of-sight velocity field of each orbit on the basis of a quadratic polynomial fitting difference;

wherein the verifying precision of a result of the InSAR data comprises:
calculating a difference distribution of the same name points of the InSAR data in an overlapping region of adjacent orbits;

wherein the solving a three-dimensional deformation field based on of a least square method comprises:
interpolating the GNSS data into a continuous velocity field having the same resolution as the InSAR data, constructing a three-dimensional decomposition equation, solving the three-dimensional deformation field on the basis of the least square method, determining crustal deformation characteristics of the study region according to the three-dimensional deformation field, and based on the crustal deformation characteristics, monitoring geological hazard in the study region to thereby achieve geological hazard monitoring; and wherein the analyzing and verifying a result comprises:
carrying out verification in combination with regional tectonic deformation data.

2. The three-dimensional deformation field modeling method fusing GNSS/InSAR observation data according to claim 1, wherein in view of a difference of spatial reference datums of two kinds of geodetic data, the three-dimensional deformation field is obtained on the basis of a least square principle.

3. The three-dimensional deformation field modeling method fusing GNSS/InSAR observation data according to claim 1, wherein the obtained three-dimensional deformation field reflects more refined surface deformation characteristics in combination with the advantages of the GNSS/InSAR observation data, and has application scenarios comprising the fields of geological hazard monitoring and engineering deformation monitoring.

4. A three-dimensional deformation field modeling method fusing GNSS/InSAR observation data, comprising:
S1, solving an InSAR line-of-sight velocity field of a study region, comprising:
carrying out time series processing according to a SBAS-InSAR method, setting a reasonable space-time baseline threshold, and selecting an interference pair; and
correcting an atmospheric delay error;
S2, unifying a spatial reference datum of GNSS data and InSAR data, comprising:
down-sampling the InSAR line-of-sight velocity field to find the same name points of ascending and descending orbit data; and
projecting a GNSS velocity field to a line-of-sight, then subtracting the GNSS velocity field from the InSAR data, and correcting an original InSAR line-of-sight velocity field of each orbit on the basis of a quadratic polynomial fitting difference;
S3, verifying precision of a result of the InSAR data, comprising:
calculating a difference distribution of the same name points of the InSAR data in an overlapping region of adjacent orbits;
S4, solving a three-dimensional deformation field based on a least square method, comprising:
interpolating the GNSS data into a continuous velocity field having the same resolution as the InSAR data, constructing a three-dimensional decomposition equation, and solving a three-dimensional deformation field on the basis of the least square method;
S5, analyzing and verifying a result, comprising:
carrying out verification in combination with regional tectonic deformation data; and
S6, determining crustal deformation characteristics of the study region according to the three-dimensional deformation field, and based on the crustal deformation characteristics, sending, by a processor, early warning information of geological hazard to a mobile terminal of personnel in the study region to thereby provide early warning for the personnel.

* * * * *